United States Patent
Sugiyama et al.

(10) Patent No.: US 11,338,482 B2
(45) Date of Patent: May 24, 2022

(54) RESIN MOLDING DEVICE AND METHOD

(71) Applicant: NANJO AUTO INTERIOR CO., LTD., Hiroshima (JP)

(72) Inventors: Daisuke Sugiyama, Akitakada (JP); Toshikazu Tanimura, Akitakada (JP)

(73) Assignee: NANJO AUTO INTERIOR CO., LTD., Hiroshima (JP)

( * ) Notice: Subject to any disclaimer, the term of this patent is extended or adjusted under 35 U.S.C. 154(b) by 344 days.

(21) Appl. No.: 16/576,311

(22) Filed: Sep. 19, 2019

(65) Prior Publication Data

US 2020/0009773 A1 Jan. 9, 2020

Related U.S. Application Data (63) Continuation of application No. PCT/JP2018/044430, filed on Dec. 3, 2018.

(30) Foreign Application Priority Data

Dec. 5, 2017 (JP) .............................. JP2017-233431

(51) Int. Cl.
  *B29C 45/04* (2006.01)
  *B29C 45/14* (2006.01)
  *B29C 45/18* (2006.01)
  *B32B 5/18* (2006.01)

(52) U.S. Cl.
  CPC .... *B29C 45/0416* (2013.01); *B29C 45/14795* (2013.01); *B29C 45/14811* (2013.01); *B29C 45/1816* (2013.01); *B29C 2045/1825* (2013.01); *B32B 5/18* (2013.01)

(58) Field of Classification Search
  CPC .......... B29C 45/0416; B29C 45/14795; B29C 2045/1825; B29C 44/0415
  See application file for complete search history.

(56) References Cited

U.S. PATENT DOCUMENTS

| | | | |
|---|---|---|---|
| 5,281,376 A | 1/1994 | Hara et al. | |
| 6,004,498 A | 12/1999 | Fujii et al. | |
| 2005/0181085 A1* | 8/2005 | Harada | ................ B29C 44/083 425/4 R |
| 2009/0252929 A1* | 10/2009 | Egawa | .................... B29C 45/56 428/158 |
| 2013/0328229 A1 | 12/2013 | Helming et al. | |

FOREIGN PATENT DOCUMENTS

| | | |
|---|---|---|
| CN | 101549539 A | 10/2009 |
| GB | 1303517 A | 1/1973 |
| JP | S58-078733 A | 11/1984 |

(Continued)

OTHER PUBLICATIONS

Sugiyama, "Slide Mold Control for Form Structure of Skin Integrated Molded Product". Retrieved Aug. 19, 2019.

(Continued)

*Primary Examiner* — Kelly M Gambetta
*Assistant Examiner* — Virak Nguon
(74) *Attorney, Agent, or Firm* — Maschoff Brennan (57) ABSTRACT

A movable mold includes a main mold part, a separate mold part separate from the main mold part, and a relative movement mechanism moving the separate mold part relative to the main mold part in a driving direction of a mold driver.

12 Claims, 7 Drawing Sheets

(56) References Cited

FOREIGN PATENT DOCUMENTS

| | | | |
|---|---|---|---|
| JP | H08-85131 A | | 4/1996 |
| JP | H08-118412 A | | 5/1996 |
| JP | 08281699 A | * | 10/1996 |
| JP | H08-281699 A | | 10/1996 |
| JP | 2000-263576 A | | 9/2000 |
| JP | 2003-266469 A | | 9/2003 |
| JP | 2006-232187 A | | 9/2006 |
| JP | 2007-216529 A | | 8/2007 |
| JP | 2009-166458 A | | 7/2009 |
| JP | 2009166458 A | * | 7/2009 |
| JP | 2009-248389 A | | 10/2009 |
| TW | 212156 B | | 9/1993 |

OTHER PUBLICATIONS

International Search Report and Written Opinion dated Feb. 26, 2019 for application PCT/JP2018/044430.

\* cited by examiner

LEFT ← → RIGHT

FIG. 5

LEFT ←　　　　　　→ RIGHT

LEFT ← → RIGHT

RESIN MOLDING DEVICE AND METHOD

CROSS-REFERENCE TO RELATED APPLICATIONS

This is a continuation of International Application No. PCT/JP2018/044430 filed on Dec. 3, 2018, which claims priority to Japanese Patent Application No. 2017-233431 filed on Dec. 5, 2017. The entire disclosures of these applications are incorporated by reference herein.

BACKGROUND

The present invention relates to a resin molding device and method for molding a resin product including a foamed layer.

Conventionally, for example, a resin product such as an interior material of a motor vehicle has been molded using a molding device including molding molds (see, for example, Japanese Unexamined Patent Publication No. H08-118412 and Japanese Unexamined Patent Publication No. 2000-263576). The resin product molded in Japanese Unexamined Patent Publication No. H08-118412 includes a resin base material, and a resin skin material fused to cover a portion of the surface of the base material. The surface of the base material has an exposed portion that is not covered with the skin material. The molding device of Japanese Unexamined Patent Publication No. H08-118412 includes a female mold and a core mold. Then, while the female mold is opened to the core mold, the skin material is placed on the molding surface of the female mold, and the female mold and the core mold are then clamped together. After the clamping, a resin material is injected into a cavity to form a base material integrated with the skin material. After the resin is solidified, the molds are opened to remove the resin product.

The resin product of Japanese Unexamined Patent Publication No. 2000-263576 includes a skin material including a foamed layer as a cushion layer, and a base material including another foamed layer. In Japanese Unexamined Patent Publication No. 2000-263576, a resin product is formed using a so-called stamping mold. Specifically, first, the skin material is placed between upper and lower molds, and a base material-molding resin containing a foaming agent is then injected into the cavity with the upper and lower molds open. Then, the upper and lower molds are clamped to mold a base material, and at the same time, the base material and the skin material are integrated together. Thereafter, the upper and lower molds are opened to foam the base material, the foamed base material is then cooled and solidified, and the resin product is removed.

SUMMARY

According to Japanese Unexamined Patent Publication No. H08-118412, the entire base material is a solid including no foamed layer. Thus, the base material of Japanese Unexamined Patent Publication No. H08-118412 unfortunately has a higher weight than a base material including such a foamed layer as described in Japanese Unexamined Patent Publication No. 2000-263576. To address this problem, if the base material is foamed by using a base material-molding resin containing a resin material and a foaming agent together as described in Japanese Unexamined Patent Publication No. 2000-263576, a lightweight resin product with a desired rigidity can be obtained.

However, in some cases, as described in Japanese Unexamined Patent Publication No. H08-118412, only a portion of the surface of the base material is covered with the skin material, and the other portion of the surface of the base material is exposed without being covered with the skin material. If the skin material is provided only on the portion of the base material as described above, difficulty may arise in forming the foamed layer of the base material. Specifically, in a process of forming the base material, as described above, the base material-molding resin containing the foaming agent is injected into the cavity with the upper and lower molds open, the base material and the skin material are integrated together at the moment when the upper and lower molds are clamped to mold the base material, and then the upper and lower molds are opened to foam the base material. The degree of foaming of the base material depends not only on the amount of the foaming agent, but also on the other factors such as the timing at which the upper and lower molds start opening, the rate at which the upper and lower molds are opened, the degree of opening of the upper and lower molds, the temperature of the base material-molding resin at this timing, and the temperature of the molds. Since the skin material covering a portion of the base material-molding resin serves to insulate heat, the temperature for cooling the base material-molding resin inevitably differs between the covered portion and a portion not covered with the skin material. This makes it difficult to obtain a desired thickness, and may thus make it difficult to form a skin layer on each of a surface of the resin toward the skin material and a back surface of the resin opposite to the skin material.

If the surface of the base material in contact with the skin material is foamed, the adhesion between the skin and the base material decreases. Thus, if an attempt is made to form a skin layer near the skin material, the formation of the skin layer is retarded due to the skin material having a lower thermal conductivity than the molds. As a result, the skin layer may be excessively formed near the back surface to hinder the formation of an adequate foamed layer.

In addition, if the skin material includes a foamed layer as described in Japanese Unexamined Patent Publication No. 2000-263576, the foamed layer of the skin material may start to recover when the upper and lower molds start opening. The recovering force of the foamed layer of the skin material may limit the degree of foaming of the portion of the base material covered with the skin material to be smaller than the portion not covered with the skin material. Also in this case, the degree of foaming of the base material varies between the portion of the base material covered with the skin material and the portion not covered with the skin material.

In addition to the influence of the skin material, factors such as the shape of the base material and variations in thickness among portions of the base material may make it difficult to adjust the degree of foaming of the base material to a desired degree. The degree of foaming of each portion of the base material is hardly controlled through the adjustment of the amount of the foaming agent contained in the base material.

In view of the foregoing background, it is therefore an object of the present invention to enable easy control, and thus optimization, of the degree of foaming of a base material including a foamed layer, on a portion-by-portion basis, in molding the base material, thereby ensuring the rigidity and shock resistance of a resin product and the adhesion between a skin material and the base material of the resin product.

To achieve the object, according to the present invention, a part of one of molds is formed separately from the other part thereof so as to be independently movable in an opening direction of the molds when the molds are opened to form a foamed layer.

A first aspect of the invention is directed to a resin molding device for molding a resin product including a resin base material that includes a foamed layer. The resin molding device includes: a first mold; a second mold having a base material-molding surface serving to mold a surface of the base material opposite to the first mold; a mold driver driving one of the first and second molds toward and away from the other one to allow the first and second molds to switch between an open state and a closed state; and a resin feeder feeding a base material-molding resin containing a foaming agent that forms the base material. The one of the first and second molds includes a main mold part, a separate mold part separate from the main mold part, and a relative movement mechanism moving the separate mold part relative to the main mold part in a driving direction of the mold driver.

According to this configuration, after the first and second molds are opened, the resin feeder feeds the base material-molding resin containing the foaming agent to a space between the first mold and the base material-molding surface of the second mold. The mold driver brings the first and second molds into the closed state, thereby molding the base material-molding resin with the first and second molds. The mold driver moves the closed first and second molds relative to each other in the opening direction of the molds. Thus, the action of the foaming agent contained in the base material-molding resin allows the base material to be foamed.

In this case, one of the first and second molds has the main mold part and the separate mold part, and the relative movement mechanism can move the separate mold part relative to the main mold part in the driving direction of the mold driver. This allows the main mold part and the separate mold part to start moving in the opening direction of the molds at different timings, and allows the moving speeds of the main mold part and the separate mold part in the opening direction of the molds to easily vary. For example, moving the separate mold part in the opening direction of the molds at a speed higher than that of the main mold part increases the degree of foaming of a portion of the base material corresponding to the separate mold part. In addition, moving the separate mold part in the opening direction of the molds at a speed lower than that of the main mold part reduces the degree of foaming of a portion of the base material corresponding to the separate mold part. In this way, the degree of foaming of the base material can be easily controlled on a portion-by-portion basis.

According to a second aspect of the invention, when opening the first and second molds in the closed state, the relative movement mechanism may be configured to move the separate mold part in an opening direction of the molds at a speed lower than a moving speed of the main mold part.

According to this configuration, in the case of a resin product having a structure in which the degree of foaming of the base material tends to be high at a portion corresponding to the separate mold part, the degree of foaming of the portion of the base material corresponding to the separate mold part can be reduced.

According to a third aspect of the invention, when opening the first and second molds in the closed state, the relative movement mechanism may be configured to move the separate mold part in an opening direction of the molds at a speed higher than a moving speed of the main mold part.

According to this configuration, in the case of a resin product having a structure in which the degree of foaming of the base material tends to be low at a portion corresponding to the separate mold part, the degree of foaming of the portion of the base material corresponding to the separate mold part can be increased.

According to a fourth aspect of the invention, the first mold may include the main mold part, the separate mold part, and the relative movement mechanism, the main mold part may have a skin material placement surface on which a skin material of the resin product is to be placed, and the separate mold part may have an exposed portion-molding surface which molds an exposed portion of the base material exposed from the skin material.

According to this configuration, the skin material can be placed on the main mold part, and the exposed portion of the base material can be formed by the exposed portion-molding surface of the separate mold part. Moving the main mold part and the separate mold part relative to each other makes it possible to control the degree of foaming of each portion of the base material in consideration of, for example, the heat insulating performance of the skin material.

According to a fifth aspect of the invention, the skin material including the foamed layer made of an elastic material may be placed on the skin material placement surface.

Specifically, when the molds are to be opened, the recovering force of the foamed layer of the skin material may limit the degree of foaming of the base material. However, the present invention allows the main mold part on which the skin material including the foamed layer made of an elastic material is placed and the separate mold part serving to mold the exposed portion of the base material to move relative to each other. This enables easy control of the degree of foaming of each portion of the base material in consideration of the elastic force of the skin material.

According to a sixth aspect of the invention, the mold driver may drive the first mold.

According to this configuration, while the main mold part and the separate mold part are moved relative to the second mold, the main mold part and the separate mold part can be moved relative to each other.

A seventh aspect of the invention is directed to a resin molding method for molding a resin product including a base material, the base material including a foamed layer and being made of a resin. The method includes: preparing first and second molds; a resin feeding step of feeding a base material-molding resin to a base material-molding surface of the second mold, the base material-molding resin containing a foaming agent that forms the base material; a base material molding step of clamping the first and second molds to mold the base material after the resin feeding step; and a base material foaming step of, when the first and second molds are to be opened to foam the base material, moving a main mold part and a separate mold part both forming one of the first and second molds relative to each other in a driving direction of a mold driver, the base material foaming step being performed after the base material molding step, the separate mold part being separate from the main mold part.

According to an eighth aspect of the invention, the method may further include: a skin material placing step of placing a skin material, which is to be laminated on, and integrated with, the base material, on a skin material placement surface of the first mold In this case, the skin material placing step is preferably performed before the resin feeding step.

According to the first and seventh aspects of the invention, one of a first mold or a second mold having a base material-molding surface is divided into a main mold part and a separate mold part, and the separate mold part can be moved relative to the main mold part in the driving direction of a mold driver. This enables easy control, and thus optimization, of the degree of foaming of a base material including a foamed layer, on a portion-by-portion basis, in molding the base material.

According to the second aspect of the invention, reducing the degree of foaming of a portion of the base material corresponding to the separate mold part can optimize the degree of foaming of the base material on a portion-by-portion basis.

According to the third aspect of the invention, increasing the degree of foaming of the portion of the base material corresponding to the separate mold part can optimize the degree of foaming of the base material on a portion-by-portion basis.

According to the fourth and eighth aspects of the invention, the skin material can be placed on the main mold part of the first mold, and an exposed portion of the base material can be molded with the separate mold part. In this case, the main mold part and the separate mold part can be moved relative to each other. This makes it possible to easily control the degree of foaming of each portion of the base material in consideration of the heat insulating performance of the skin material.

According to the fifth aspect of the invention, if the skin material including the foamed layer made of an elastic material is used, the degree of foaming of each portion of the base material can be easily controlled in consideration of the elastic force of the skin material.

According to the sixth aspect of the invention, the mold driver can move the main mold part and the separate mold part, and when moving these mold parts, can change the relative speeds of the main mold part and the separate mold part.

DETAILED DESCRIPTION

Embodiments of the present disclosure will be described in detail with reference to the drawings. The following description of preferred embodiments is only an example in nature, and is not intended to limit the scope, applications or use of the present invention.

(Description of Resin Product)

Figure 1:
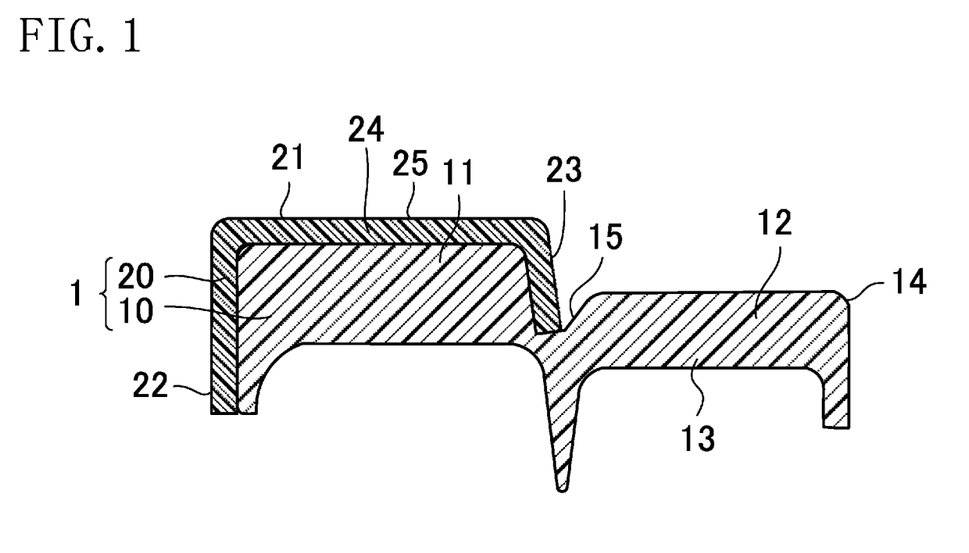
FIG. 1 is a cross-sectional view of a resin product.

FIG. 1 is a cross-sectional view of a resin product 1 molded by a resin molding method in which a resin molding device 30 (shown in FIG. 2) according to an embodiment of the present invention is used. The resin product 1 is a member that can be used, for example, as an interior material of a motor vehicle, any one of various building materials, and any other suitable material, and includes a resin base material 10 and a resin skin material 20. The base material 10 is formed of a base material-molding resin containing a foaming agent, which will be described later, and has a covered portion 11 covered with the skin material 20, and a portion not covered with the skin material 20 (i.e., an exposed portion 12 exposed from the skin material 20). The covered portion 11 and the exposed portion 12 are both formed in the shape of a plate. The skin material 20 is not an essential member. The skin material 20 may be omitted.

The base material 10 includes a foamed layer 13, and a non-foamed outer layer (skin layer) 14 covering the entire surface of the foamed layer 13. The thickness of the foamed layer 13 can be set to be, for example, about 1 mm to 5 mm. However, this range is merely an example. This thickness may be set to be an optional value in consideration of the required rigidity and any other characteristics of the resin product 1. The outer layer 14 is a solid layer, and the thickness of the outer layer 14 can be set to be, for example, about 0.3 mm to 0.5 mm. However, this range is merely an example. This thickness may be set to be an optional value in consideration of the required rigidity and any other characteristics of the resin product 1.

A surface of the base material 10 on which the skin material 20 is provided has a groove 15 into which an end portion of the skin material 20 is inserted. The groove 15 serves as a boundary between the covered portion 11 on the left and the exposed portion 12 on the right in FIG. 1.

The skin material 20 has a body 21 arranged to extend along the covered portion 11 of the base material 10 and face the inside of a passenger compartment, a first side portion 22 extending from an edge of the body 21 along the vertical surface of the covered portion 11 of the base material 10, and a second side portion 23 extending toward the bottom of the groove 15 of the base material 10. The skin material 20 includes a foamed layer 24 made of, for example, an elastic material, and a non-foamed outer layer 25 covering at least one surface of the foamed layer 24. The foamed layer 24 may be made of a foam such as polypropylene. The outer layer 25 may be made of soft polyvinyl chloride (PVC) or any other suitable material.

The skin material 20 has a surface (a surface of the outer layer 25) grained, for example, and is previously molded in a three-dimensional shape to include the body 21, the first side portion 22, and the second side portion 23. This molding is referred to as "premolding." In the premolding, a skin material 20 having a thickness of about 2.4 mm, for example, is prepared. The skin material 20 is heated to about 160° C., for example, and then molded in a vacuum while being compressed to a thickness of about 1.8 mm between upper and lower molds (not shown) defining grains to be transferred to the skin material. This allows the skin material 20 to be grained, and simultaneously, to substantially conform to a main mold part 40 of the resin molding device 30. Note that the skin material 20 is fused to the base material 10.

(Configuration of Resin Molding Device 30)

Figure 2:
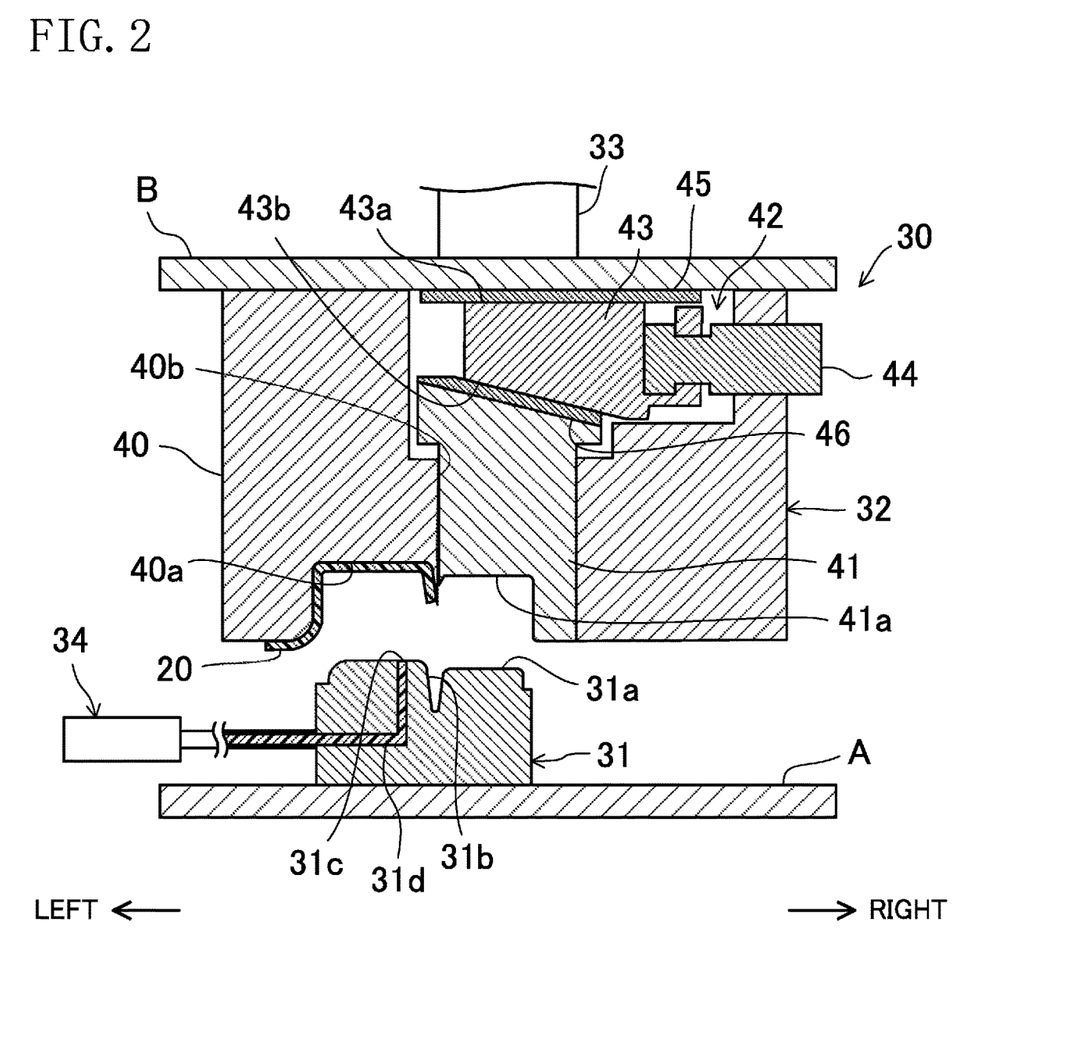
FIG. 2 is a longitudinal sectional view of a resin molding device on which a skin material is placed.

Next, the configuration of the resin molding device 30 shown in FIG. 2 will be described. The resin molding device 30 is used to mold the resin product 1 described above. This resin product 1 includes the resin base material 10 having the foamed layer 13 shown in FIG. 1, and the resin skin material 20 laminated on, and integrated with, the base material 10. This device 30 includes a fixed mold (a second mold) 31, a movable mold (a first mold) 32, a mold driver 33, and a resin feeder 34.

The fixed mold 31 is disposed below the movable mold 32, and is fixed to a fixed platen A so as not to move relative to the fixed platen A. The fixed platen A is fixed so as not to move relative to the floor surface of a factory or any other building where the resin molding device 30 is installed, and extends substantially horizontally. The fixed platen A may be included in a molding press if the molding press is installed.

An upper surface of the fixed mold 31 is a base material-molding surface 31a for molding a surface (lower surface in FIG. 1) of the base material 10 opposite to a surface thereof on which the skin material 20 is laminated. The fixed mold 31 is provided with a warmer (not shown), which warms the base material-molding surface 31a. The temperature of the base material-molding surface 31a can be set to be, for example, about 30° C. to 50° C.

The base material-molding surface 31a has a groove 31b for molding a portion of the base material 10 corresponding to the groove 15, and at least one gate 31c opened through the surface 31a. Although only one gate 31c is shown in FIG. 2, a plurality of gates 31c may be provided. The gate 31c opens through a portion of the base material-molding surface 31a serving to mold the covered portion 11. Thus, the gate 31c faces the back surface of the skin material 20. The gate 31c may open through a portion of the base material-molding surface 31a serving to mold the exposed portion 12.

A hot runner 31d is provided inside the fixed mold 31. The hot runner 31d is a member that forms a resin passage through which a resin fed from the resin feeder 34 flows. A downstream end of the hot runner 31d in the direction in which the resin flows is connected to the gate 31c.

The resin feeder 34 may have a structure that has been known in the art. The resin feeder 34 includes an injector (not shown) for quantitatively feeding a base material-molding resin containing a foaming agent, and is configured to heat the pressurized resin to the melting temperature or higher in a cylinder of the injector. The base material-molding resin contains a foaming agent. However, the internal pressure of the cylinder is determined to prevent the base material-molding resin from foaming inside the cylinder. The temperature of the base material-molding resin may be set to be, for example, about 200° C. An outlet of the cylinder of the resin feeder 34 is connected to an upstream end of the hot runner 31d in the direction in which the resin flows. Non-limiting examples of the foaming agent include a chemical foaming agent that has been known in the art.

The movable mold 32 is disposed above the fixed mold 31. The movable mold 32 is also provided with a warmer similar to that of the fixed mold 31. The mold driver 33 is configured as a hydraulic cylinder system or any other suitable system connected to the movable mold 32, and is configured to drive the movable mold 32 toward and away from the fixed mold 31 to allow the movable mold 32 and the fixed mold 31 to switch between an open state (shown in FIGS. 2 and 7) and a closed state (shown in FIG. 4). In this embodiment, the movable mold 32 is disposed above the fixed mold 31. This allows the mold driver 33 to move the movable mold 32 upward and downward. If the mold driver 33 moves the movable mold 32 downward, the movable mold 32 and the fixed mold 31 can be brought into the closed state. Meanwhile, if the mold driver 33 moves the closed movable mold 32 upward, the movable mold 32 and the fixed mold 31 can be brought into the open state.

The mold driver 33 is controlled by a controller (not shown). All of parameters such as the direction in which the mold driver 33 moves the movable mold 32, the timing at which the movable mold 32 starts moving, the moving speed of the movable mold 32, the distance traveled by the movable mold 32 can be controlled by the controller.

The movable mold 32 is attached to a movable platen B fixed to the mold driver 33. The movable mold 32 includes the main mold part 40, a separate mold part 41 separate from the main mold part 40, and a relative movement mechanism 42 relatively moving the separate mold part 41 with respect to the main mold part 40 in the driving direction of the mold driver 33. The main mold part 40 is fixed to a lower surface of the movable platen B, and faces a portion of the base material-molding surface 31a of the fixed mold 31 serving to mold the covered portion 11. A lower surface of the main mold part 40 is configured as a skin material placement surface 40a on which the skin material 20 is placed. The skin material placement surface 40a is formed to correspond to the shape of the premolded skin material 20, and forms a concave shape so as to be recessed upward in this embodiment.

The main mold part 40 has a through hole 40b through which the separate mold part 41 is moved upward and downward. The separate mold part 41 can be moved relative to the main mold part 40 in the driving direction of the mold driver 33 (vertical direction) while being inserted into the through hole 40b of the main mold part 40.

The separate mold part 41 faces a portion of the base material-molding surface 31a of the fixed mold 31 serving to mold the exposed portion 12. A lower surface of the separate mold part 41 is configured as an exposed portion-molding surface 41a serving to mold the exposed portion 12 of the base material 10. The exposed portion-molding surface 41a of the separate mold part 41 and the skin material placement surface 40a of the main mold part 40 are adjacent to each other. The boundary between the exposed portion-molding surface 41a of the separate mold part 41 and the skin material placement surface 40a of the main mold part 40 just faces the groove 15 of the base material 10.

The relative movement mechanism 42 is used to move the separate mold part 41 separately from the main mold part 40, and includes a cam member 43, a cam member driver 44 driving the cam member 43, and upper and lower guide members 45 and 46 guiding the cam member 43. The cam member 43 moves forward and backward between the upper and lower guide members 45 and 46 in a substantially horizontal direction. In this embodiment, a direction toward the left side of FIG. 2 corresponds to a direction in which the cam member 43 moves forward, and a direction toward the right side of FIG. 2 corresponds to a direction in which the cam member 43 moves backward.

An upper surface of the cam member 43 is configured as a horizontal surface 43a extending substantially horizontally, whereas a lower surface of the cam member 43 is configured as an inclined surface 43b inclined upward toward a front end of the cam member 43 in the direction in which the cam member 43 moves forward. That is to say, the cam member 43 is formed in a wedge shape having a vertical dimension that gradually decreases in the direction in which it moves forward.

The upper and lower guide members 45 and 46 are configured as guide rail members or any other suitable members extending in a straight line. The upper guide member 45 is fixed to the lower surface of the movable platen B, and extends substantially horizontally (in a lateral direction in FIG. 2) along the lower surface of the movable platen B. The horizontal surface 43a of the cam member 43 is movable in the lateral direction in FIG. 2 while being engaged with a lower surface of the upper guide member 45. The lower guide member 46 is fixed to an upper surface of the separate mold part 41, and extends in the lateral direction in FIG. 2 while being inclined at the same angle as that of the inclined surface 43b of the cam member 43. The inclined surface 43b of the cam member 43 is movable in the lateral direction in FIG. 2 while being engaged with the upper surface of the lower guide member 46. The inclined surface 43b of the cam member 43 engaged with the upper surface of the lower guide member 46 allows the cam member 43 and the separate mold part 41 to be connected together via the lower guide member 46 such that the cam member 43 and the separate mold part 41 are movable relative to each other in the lateral direction. This blocks the separate mold part 41 from dropping off. The same statement applies to the upper guide member 45. Thus, the cam member 43 can be blocked from dropping off. That is to say, in this embodiment, the movable mold 32 includes the main mold part 40, the separate mold part 41, and the relative movement mechanism 42, which are configured as a unit.

The cam member 43 is disposed between the upper and lower guide members 45 and 46, and is movable relative to the upper and lower guide members 45 and 46 in the lateral direction.

The cam member 43 has a base end (a right end shown in FIG. 2) connected to the cam member driver 44. The cam member driver 44 can be configured as a hydraulic cylinder system just like the mold driver 33. The direction in which the cam member driver 44 drives the cam member 43 corresponds to the lateral direction in FIG. 2, i.e., the direction in which the cam member 43 moves forward and backward. This allows the cam member 43 to switch between a state in which the cam member 43 is moved forward and a state in which the cam member 43 is moved backward. The cam member driver 44 is controlled by a controller (not shown). All of parameters such as the direction in which the cam member driver 44 moves the cam member 43, the timing at which the cam member 43 starts moving, the moving speed of the cam member 43, the distance traveled by the cam member 43 can be controlled by the controller.

If the cam member driver 44 moves the cam member 43 forward, the cam member 43 moves leftward between the upper and lower guide members 45 and 46. In this case, the lower surface of the cam member 43, which is formed as the inclined surface 43b, allows the separate mold part 41 to move downward. The forward movement of the cam member 43 does not cause the main mold part 40 to move. This allows the separate mold part 41 to move relative to the main mold part 40.

If the cam member driver 44 moves the cam member 43 backward from a position at which the cam member 43 has been moved forward, the cam member 43 moves rightward between the upper and lower guide members 45 and 46. In this case, the lower surface of the cam member 43, which is formed as the inclined surface 43b, allows the separate mold part 41 to move upward. The backward movement of the cam member 43 does not cause the main mold part 40 to move. This allows the separate mold part 41 to move relative to the main mold part 40.

The cam member 43 can be optionally controlled by the cam member driver 44 of the relative movement mechanism 42. The cam member driver 44 and the mold driver 33 can be independently controlled. Thus, for example, when the mold driver 33 opens the movable mold 32 and the fixed mold 31 in the closed state, the cam member driver 44 may be actuated to move the separate mold part 41 in the opening direction of the molds at a speed lower than the moving speed of the main mold part 40.

In contrast, when the mold driver 33 opens the movable mold 32 and the fixed mold 31 in the closed state, the cam member driver 44 may be actuated to move the separate mold part 41 in the opening direction of the molds at a speed higher than the moving speed of the main mold part 40. The initial position of the cam member 43 may be determined to be an uppermost position or lowermost position of the cam member 43. Alternatively, the initial position of the cam member 43 may be determined to be an intermediate position between the uppermost position and the lowermost position.

Further, when the mold driver 33 opens the movable mold 32 and the fixed mold 31 in the closed state, the cam member driver 44 may also be actuated so as not to move the separate mold part 41 relative to the fixed mold 31 for a fixed period of time. In this case, when the movable mold 32 and the fixed mold 31 are opened, only the main mold part 40 moves away from the fixed mold 31 for a fixed period of time.

When the mold driver 33 opens the movable mold 32 and the fixed mold 31 in the closed state, the main mold part 40 may be made unmovable relative to the fixed mold 31 for a fixed period of time, and the cam member driver 44 and the mold driver 33 may be controlled so that only the separate mold part 41 moves away from the fixed mold 31. In other words, while the mold driver 33 keeps the molds closed, the cam member driver 44 moves the cam member 43 rightward. This allows only the separate mold part 41 to move away from the fixed mold 31.

As can be seen from the foregoing description, the provision of the relative movement mechanism 42 improves the degree of freedom in setting the timing of movement and moving speed of each of the main mold part 40 and the separate mold part 41 and the distance traveled by each of the main portion 40 and the separate mold part 41 In addition to the exemplary movement pattern described above, various movement patterns can be formed by controlling the cam member driver 44 and the mold driver 33.

In the foregoing embodiment, the movable mold 32 and the fixed mold 31 are arranged vertically. However, this arrangement is merely an example of the present invention. The molds may be arranged horizontally. If the molds are arranged horizontally, either of the molds may be driven by the mold driver 33. The relative movement mechanism 42 may be provided on either of the molds.

(Resin Molding Method)

Next, a resin molding method for molding a resin product 1 using the resin molding device 30 configured as described above will be described. The resin molding method is a method for molding a resin product 1 that includes a resin base material 10 including a foamed layer 24, and a resin skin material 20 laminated on, and integrated with, the base material 10. This method broadly includes a skin material placing step, a resin feeding step, a base material molding step, a base material foaming step, and a mold removing step.

Before the skin material placing step, a premolded skin material 20 is prepared. In the skin material placing step, as shown in FIG. 2, the movable mold 32 is moved upward by the mold driver 33, thereby bringing the movable mold 32 and the fixed mold 31 into an open state. Further, the cam member driver 44 moves the cam member 43 rightward to allow the separate mold part 41 to be positioned at an uppermost position of the separate mold part 41. Then, the skin material 20 is placed so as to be fitted onto the skin material placement surface 40a of the main mold part 40. At this time, a holder or any other suitable tool (not shown) for retaining the skin material 20 on the skin material placement surface 40a may be used to place the skin material 20. The movable mold 32 and the fixed mold 31 are warmed to a predetermined temperature.

Figure 3:
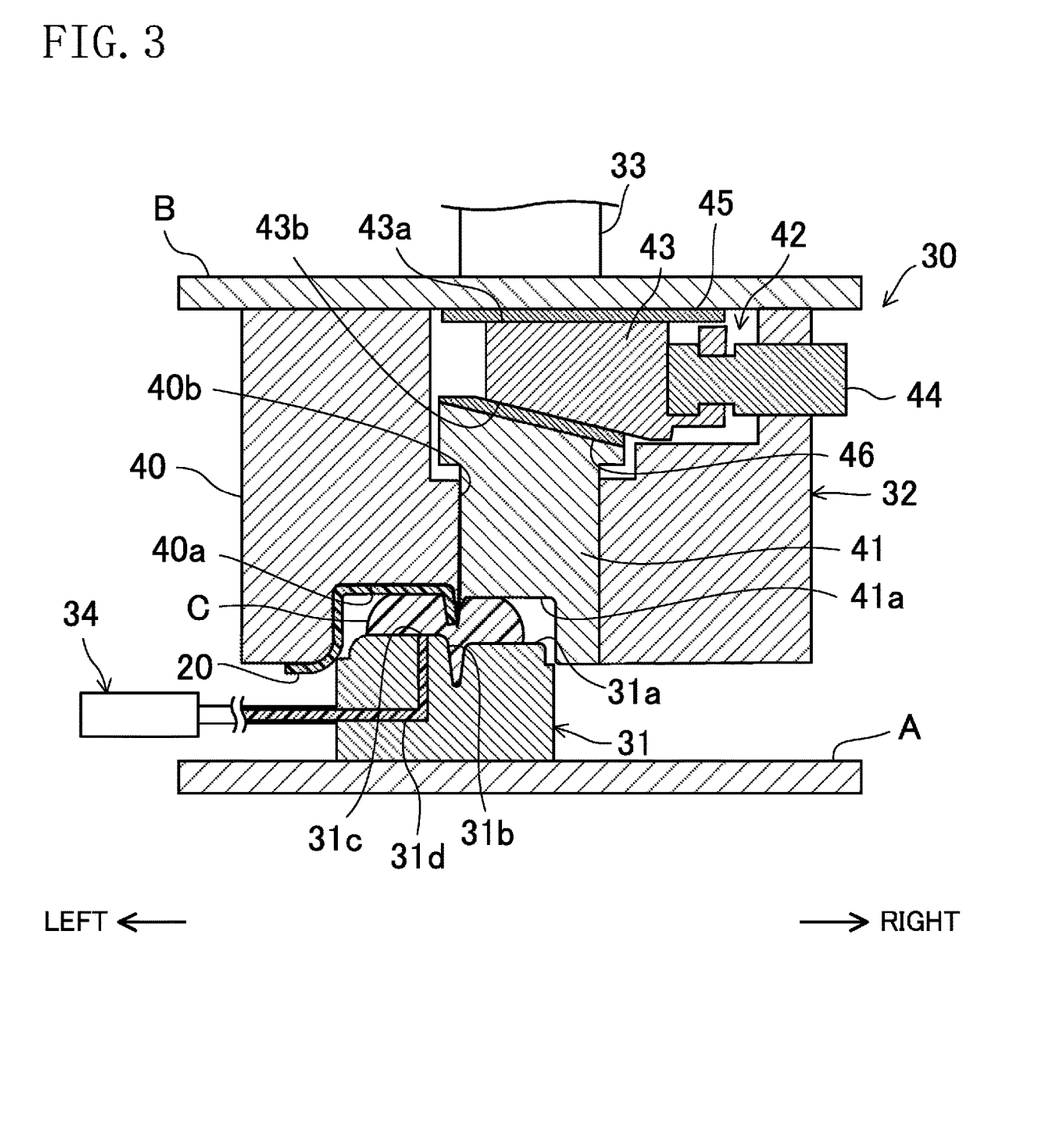
FIG. 3 is a longitudinal sectional view of a resin molding device to which a base material-molding resin is fed.

After the skin material placing step, the resin feeding step shown in FIG. 3 is performed. After the skin material placing step has been finished, the movable mold 32 is moved downward by the mold driver 33, and a base material-molding resin C forming the base material 10 and containing a foaming agent is fed to the base material-molding surface 31a at the timing before clamping the movable mold 32 and the fixed mold 31. Specifically, when quantitatively fed from the resin feeder 34, the base material-molding resin C containing the foaming agent reaches the gate 31c through the hot runner 31d inside the fixed mold 31, and then flows out through the gate 31c onto the base material-molding surface 31a. The base material-molding resin C flows between the base material-molding surface 31a and the back surface of the skin material 20, and reaches a space between the exposed portion-molding surface 41a of the separate mold part 41 and the base material-molding surface 31a.

Figure 4:
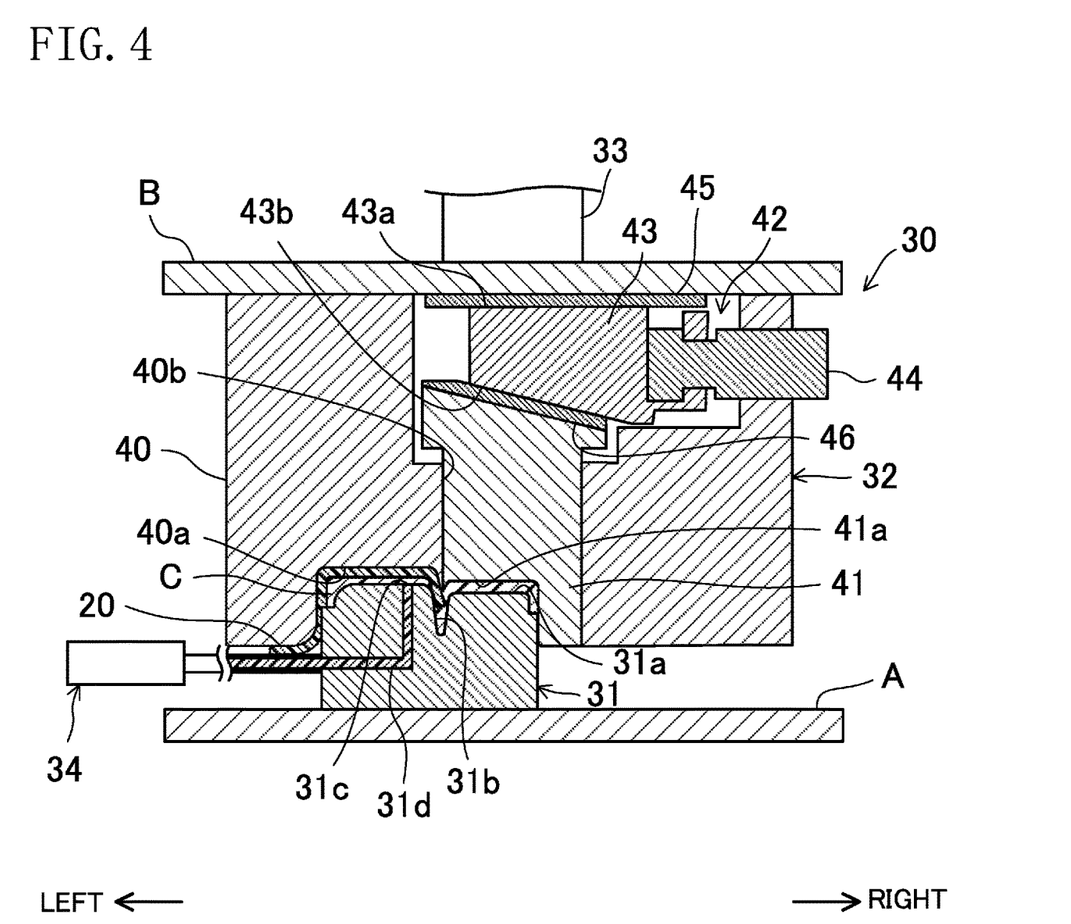
FIG. 4 is a longitudinal sectional view of a resin molding device including molds that have been clamped to mold a base material.

After the resin feeding step, the base material molding step shown in FIG. 4 is performed. In the base material molding step, the mold driver 33 moves the movable mold 32 further downward so that the movable mold 32 and the fixed mold 31 are clamped to mold the base material 10. To mold the base material 10, the base material-molding resin C is pressurized between the movable mold 32 and the fixed mold 31. The foamed layer 24 of the skin material 20 is elastically deformed by the applied pressure, thereby reducing the thickness of the foamed layer 24. In this step, the formation of the outer layer 14 of the base material 10 starts.

Figure 5:
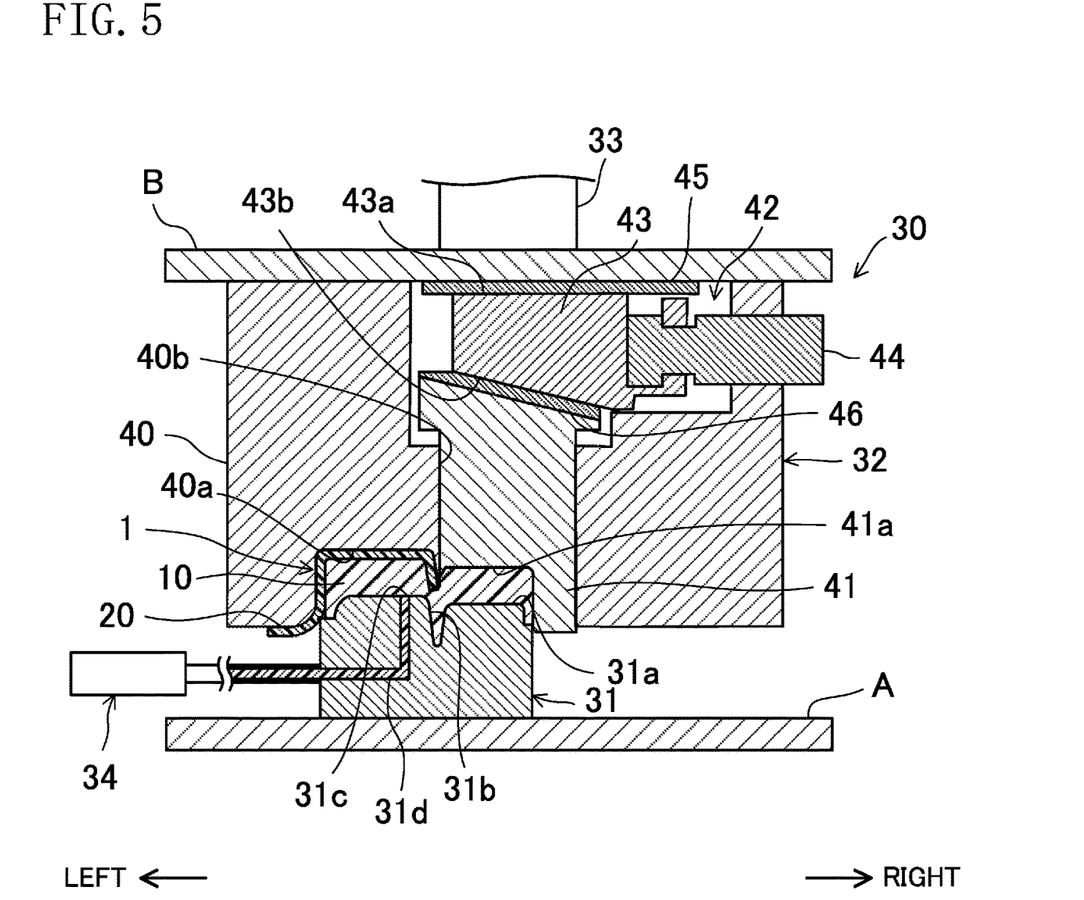
FIG. 5 is a longitudinal sectional view of a resin molding device in which a main mold part and a separate mold part are moved relative to each other.

After the base material molding step, the base material foaming step shown in FIG. 5 is performed. In the base material foaming step, the mold driver 33 moves the movable mold 32 upward at the timing at which the outer layer 14 of the base material 10 has been formed and before the base material-molding resin C is completely solidified. As a result, the base material-molding resin C is foamed to form the foamed layer 13. The timing of actuation of the mold driver 33 can be obtained by an experiment, for example.

The order of movement of the molds is as follows. Specifically, the separate mold part 41 alone may be initially moved upward, then the entire movable mold may be moved upward, and at the same time, the separate mold part 41 may be relatively reversely moved. This can ensure an adequate period of time for cooling a portion of the base material covered with the skin material, thereby solving the foregoing problem.

The relative movement mechanism 42 moves the separate mold part 41 independently from the main mold part 40. Specifically, while the mold driver 33 moves the movable mold 32 (the main mold part 40 and the separate mold part 41) upward, the cam member driver 44 of the relative movement mechanism 42 moves the cam member 43 leftward. The cam member 43 moving leftward allows the separate mold part 41 to move downward relative to the main mold part 40. This allows the separate mold part 41 to move upward at a speed lower than the speed at which the main mold part 40 moves upward. This makes it possible to separately adjust the degree of foaming of a portion of the base material 10 corresponding to the separate mold part 41 and the degree of foaming of a portion of the base material 10 corresponding to the main mold part 40.

Figure 6:
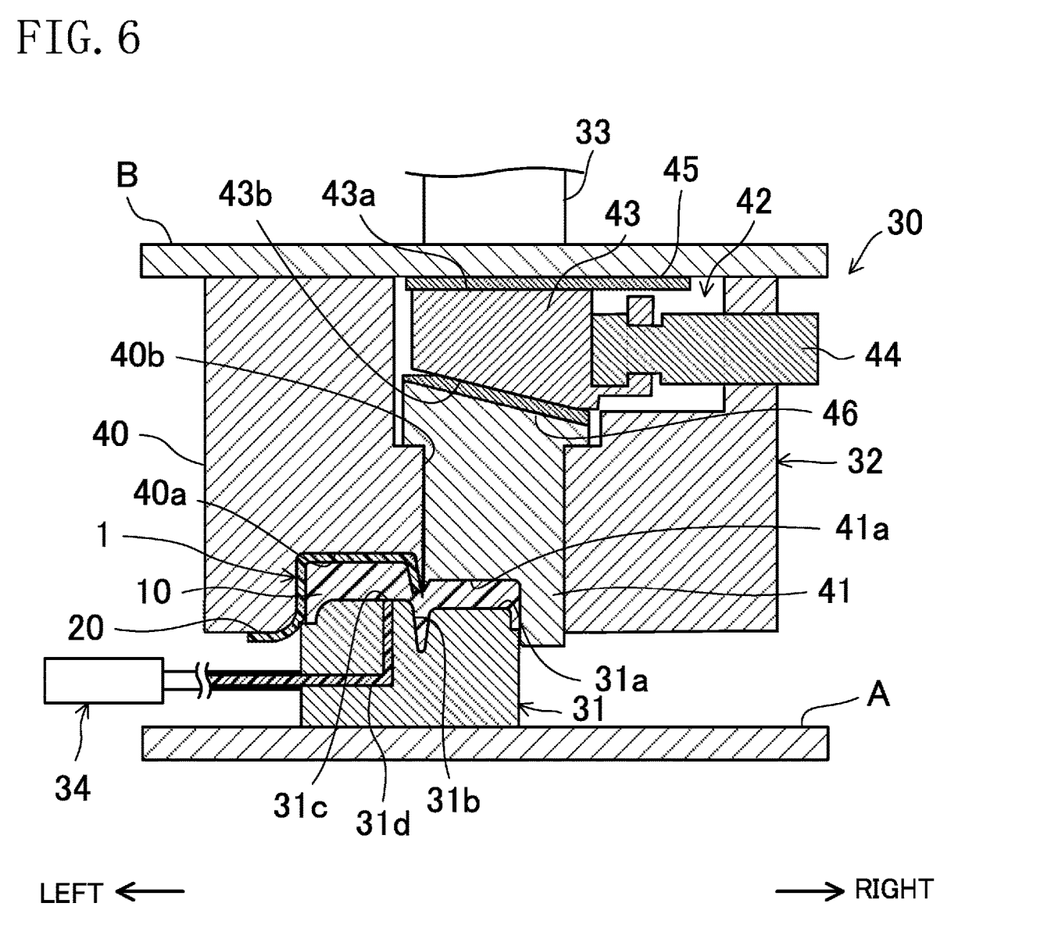
FIG. 6 is a longitudinal sectional view of another exemplary resin molding device in which a main mold part and a separate mold part are moved relative to each other.

Alternatively, as shown in FIG. 6, the cam member driver 44 of the relative movement mechanism 42 may move the cam member 43 leftward in advance. In the base material foaming step, the cam member driver 44 may move the cam member 43 rightward. The cam member 43 moving rightward allows the separate mold part 41 to move upward relative to the main mold part 40. This allows the separate mold part 41 to move upward at a speed higher than the speed at which the main mold part 40 moves upward, or allows the separate mold part 41 to stop for a fixed period of time. This also makes it possible to separately adjust the degree of foaming of the portion of the base material 10 corresponding to the separate mold part 41 and the degree of foaming of the portion of the base material 10 corresponding to the main mold part 40.

Figure 7:
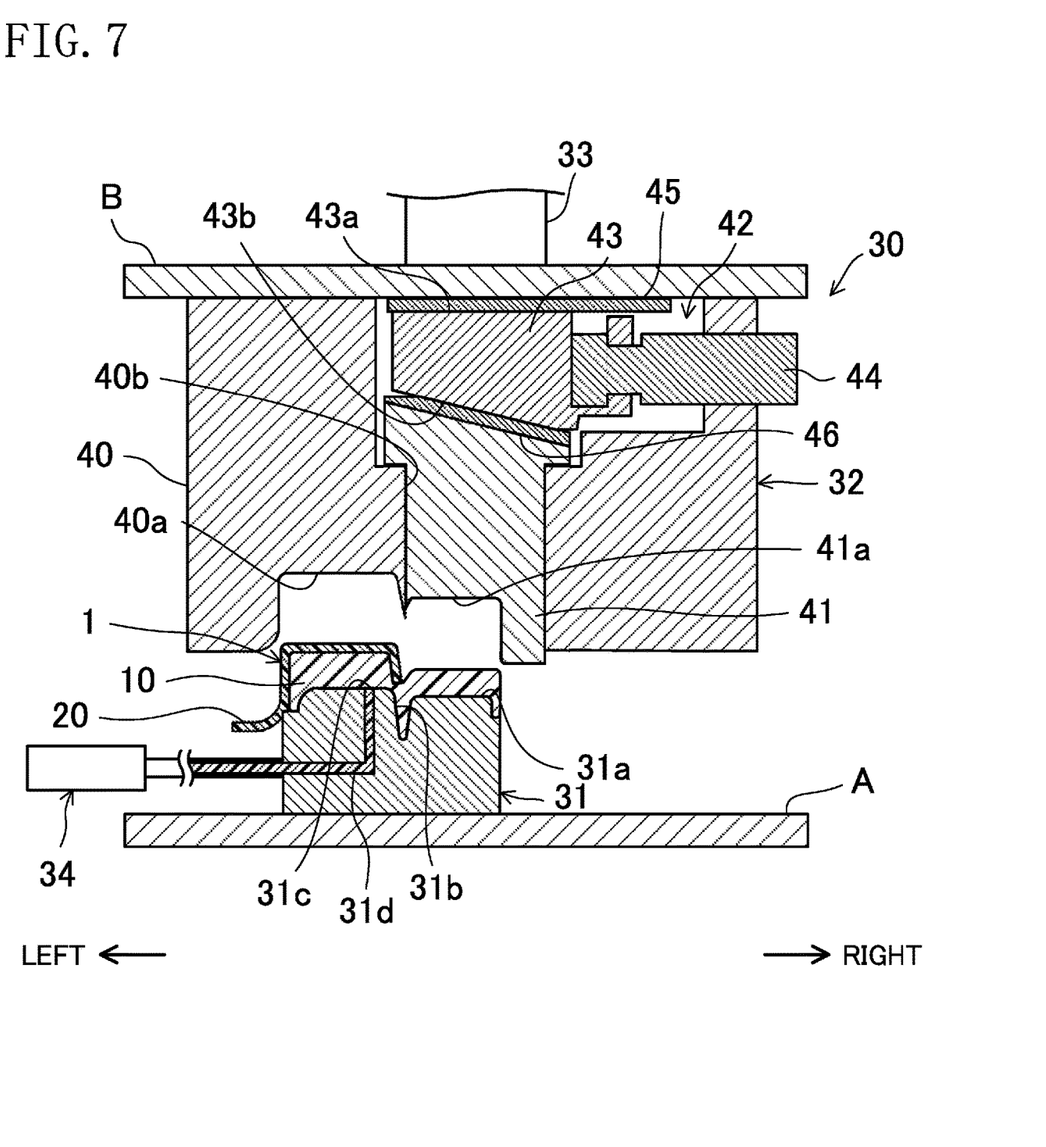
FIG. 7 is a longitudinal sectional view of a resin molding device including molds that have been opened to remove a resin product.

After the base material foaming step, the mold removing step shown in FIG. 7 is performed. In the mold removing step, the mold driver 33 moves the movable mold 32 to the uppermost position, thereby bringing the movable mold 32 and the fixed mold 31 into an open state. Thereafter, the resin product 1 is removed from the molds.

Advantages of Embodiment

As described above, according to this embodiment, after the movable mold 32 and the fixed mold 31 are opened, the skin material 20 is placed on the skin material placement surface 40a of the movable mold 32, and then the resin feeder 34 feeds the base material-molding resin C containing the foaming agent to a space between the skin material 20 and the base material-molding surface 31a of the fixed mold 31. Thereafter, the mold driver 33 brings the movable mold 32 and the fixed mold 31 into the closed state, thereby molding the base material-molding resin with the movable mold 32 and the fixed mold 31. Then, the mold driver 33 moves the closed movable and fixed molds 32 and 31 relative to each other in the opening direction of the molds. Thus, the action of the foaming agent contained in the base material-molding resin C allows the base material 10 to be foamed, thereby forming the foamed layer 13.

In this case, the movable mold 32 has the main mold part 40 and the separate mold part 41, and the relative movement mechanism 42 can move the separate mold part 41 relative to the main mold part 40 in the driving direction of the mold driver 33. This allows the main mold part 40 and the separate mold part 41 to start moving in the opening direction of the molds at different timings, and allows the moving speeds of the main mold part 40 and the separate mold part 41 in the opening direction of the molds and the distance traveled by these mold parts to easily vary. This makes it possible to easily control the degree of foaming of the base material 10 on a portion-by-portion basis, thereby optimizing the degree of foaming and thickness of the base material 10 on a portion-by-portion basis.

The embodiments described above are mere examples in every respect, and shall not be interpreted in a limited manner. Variations and modifications of equivalents of the claims are all intended to fall within the scope of the present disclosure.

For example, if the skin material is set, and the skin layer is formed in a surface of the base material near the skin material and in the back surface of the base material at the same time, the lower surface of the resin product 1 may be excessively cooled. In this case, a mold surface in contact with the lower surface of a portion of the resin product 1 on which the skin material is placed can be coated with a material having a lower thermal conductivity than the mold material to prevent the lower surface of the resin product 1 from being excessively cooled.

As can be seen from the foregoing description, the resin molding device and method according to the present invention are premised on the adjustment of the degree of foaming of the base material, the ensuring of a plate thickness, and the formation of a skin layer both in a surface of the base material near the skin material and in the back surface of the base material. The device and method are suitable for use in molding a resin product including a foamed layer, such as an interior material of a motor vehicle, to provide a resin product that ensures its rigidity and shock resistance, and adhesion between the skin material and the base material.

What is claimed is:

1. A resin molding device for molding a resin product including: a resin base material that includes a foamed layer and a non-foamed skin layer covering an entire surface of the foamed layer; and a skin material, the resin molding device comprising:
    a first mold;
    a second mold having a base material-molding surface serving to mold a surface of the base material opposite to the first mold;
    a mold driver driving one of the first and second molds toward and away from the other one to allow the first and second molds to switch between an open state and a closed state; and
    a resin feeder feeding a base material-molding resin containing a foaming agent that forms the base material to the base material-molding surface, wherein
    the first mold includes a main mold part, a separate mold part separate from the main mold part, and a relative movement mechanism moving the separate mold part relative to the main mold part in a driving direction of the mold driver,
    the main mold part has a skin material placement surface on which the skin material is to be placed, and
    the separate mold part has an exposed portion-molding surface which molds an exposed portion of the base material exposed from the skin material.
2. The resin molding device of claim 1, wherein
    when opening the first and second molds in the closed state, the relative movement mechanism is configured to move the separate mold part in an opening direction of the molds at a speed lower than a moving speed of the main mold part.
3. The resin molding device of claim 2, wherein
    the skin material including the foamed layer made of an elastic material is placed on the skin material placement surface.
4. The resin molding device of claim 2, wherein
    the mold driver drives the first mold.
5. The resin molding device of claim 1, wherein
    when opening the first and second molds in the closed state, the relative movement mechanism is configured to move the separate mold part in an opening direction of the molds at a speed higher than a moving speed of the main mold part.
6. The resin molding device of claim 5, wherein
    the skin material including the foamed layer made of an elastic material is placed on the skin material placement surface.
7. The resin molding device of claim 5, wherein
    the mold driver drives the first mold.
8. The resin molding device of claim 1, wherein
    the skin material including the foamed layer made of an elastic material is placed on the skin material placement surface.
9. The resin molding device of claim 8, wherein
    the mold driver drives the first mold.
10. The resin molding device of claim 1, wherein
    the mold driver drives the first mold.
11. A resin molding method for molding a resin product including: a resin base material that includes a foamed layer and a non-foamed skin layer covering an entire surface of the foamed layer; and a skin material, the method comprising:
    preparing first and second molds, the first mold including: a main mold part having a skin material placement surface on which the skin material is to be placed; a separate mold part separate from the main mold part and having an exposed portion-molding surface which molds an exposed portion of the base material exposed from the skin material; and a relative movement mechanism moving the separate mold part relative to the main mold part in a driving direction of a mold driver;
    a resin feeding step of feeding a base material-molding resin to a base material-molding surface of the second mold, the base material-molding resin containing a foaming agent that forms the base material;
    a base material molding step of clamping the first and second molds to mold the base material after the resin feeding step; and
    a base material foaming step of, when the first and second molds are to be opened to foam the base material, moving the main mold part and the separate mold part both forming one of the first and second molds relative to each other in a driving direction of the mold driver, the base material foaming step being performed after the base material molding step, the separate mold part being separate from the main mold part.
12. The method of claim 11, further comprising:
    a skin material placing step of placing a skin material, which is to be laminated on, and integrated with, the base material, on a skin material placement surface of the first mold.

* * * * *